(12) United States Patent
Prabhakar et al.

(10) Patent No.: US 11,263,582 B2
(45) Date of Patent: Mar. 1, 2022

(54) DISTRIBUTED LEDGER SYSTEM FOR MATERIAL MONITORING

(71) Applicant: Accenture Global Solutions Limited, Dublin (IE)

(72) Inventors: Arun Prabhakar, Bangalore (IN); Hari Padmanabhan, Bangalore (IN)

(73) Assignee: Accenture Global Solutions Limited, Dublin (IE)

(*) Notice: Subject to any disclaimer, the term of this patent is extended or adjusted under 35 U.S.C. 154(b) by 576 days.

(21) Appl. No.: 16/261,660

(22) Filed: Jan. 30, 2019

(65) Prior Publication Data
US 2020/0019931 A1 Jan. 16, 2020

(30) Foreign Application Priority Data
Jul. 10, 2018 (IN) .............................. 201811025720

(51) Int. Cl.
*G06Q 10/08* (2012.01)
*G06F 16/23* (2019.01)
*H04L 29/06* (2006.01)

(52) U.S. Cl.
CPC ..... *G06Q 10/0838* (2013.01); *G06F 16/2365* (2019.01); *H04L 63/102* (2013.01)

(58) Field of Classification Search
CPC ............ G06Q 10/0838; G06F 16/2365; H04L 63/102
USPC ........................................................ 705/341
See application file for complete search history.

(56) References Cited

U.S. PATENT DOCUMENTS

| 9,260,896 B2 | 2/2016 | Lloreda et al. | |
| 2012/0235791 A1* | 9/2012 | Donlan | G06Q 50/28 340/10.1 |
| 2016/0343124 A1* | 11/2016 | Sundheimer | G06T 7/62 |
| 2018/0096175 A1 | 4/2018 | Schmeling et al. | |

OTHER PUBLICATIONS

"Sharing Ledgers for Sharing Economics: An Exploration of Mutual Distributed Ledgers" Published by Global Financial Services Institute (Year: 2015).*
IN Office Action in Indian Appln. No. 201811025720, dated Jan. 11, 2021, 8 pages.

* cited by examiner

*Primary Examiner* — Zeina Elchanti
(74) *Attorney, Agent, or Firm* — Fish & Richardson P.C.

(57) ABSTRACT

Techniques are described for monitoring the status and transportation of materials. A monitoring platform can employ a distributed ledger system (DLS) and provide a mechanism by which various entities can access information regarding the status of transported materials, and receive alerts regarding issues arising during transport. The platform can also include logic (e.g., smart contract(s)) that executes to perform actions automatically in response to detected issues. Such actions can include remediation actions to compensate a stakeholder in the event of a theft, degradation, or other loss of transported material. The platform can receive sensor data generated by one or more devices that can be present in a vehicle that transports the material, and the data can be analyzed to identify anomalies. Alerts can be generated based on anomalies, and the alert(s) and/or sensor data can be stored on the DLS to be accessible by entities and/or logic.

20 Claims, 5 Drawing Sheets

DISTRIBUTED LEDGER SYSTEM FOR MATERIAL MONITORING

CROSS-REFERENCE TO RELATED APPLICATION

This application claims priority to Indian Patent Application No. 201811025720, filed on Jul. 10, 2018, entitled "Distributed Ledger System For Material Monitoring," the entirety of which is hereby incorporated by reference.

BACKGROUND

Traditionally, ensuring the reliable and safe transport of a material within a supply chain poses a variety of technological challenges. Pilferage and theft during distribution of transportation of a material leads to the loss of billions of dollars per year. Moreover, the adulteration of the transported material, such as deliberate dilution and/or natural spoilage or loss, can have both a negative environmental impact and a negative impact on brand value for the entities involved in producing, transporting, and/or selling the material. Moreover, safety can be effected by vehicle operator behavior, which can lead to loss of transported material, damage, and/or other negative outcomes.

SUMMARY

Implementations of the present disclosure are generally directed to a distributed ledger system for material monitoring. More particularly, implementations of the present disclosure are directed to use of a distributed ledger system to receive sensor data from internet-of-things (IoT) devices that monitor transport of a material (e.g., hydrocarbon material), generate alerts based on deviations of the sensor data from baseline data, and execute logic (e.g., a smart contract) to perform action(s) in response to detected deviations.

In general, implementations of innovative aspects of the subject matter described in this specification can be embodied in a method that includes the following operations: receiving data generated by one or more internet-of-things (IoT) devices that are arranged to monitor a material transported on a vehicle, the data describing a current state of at least a portion of the material; comparing at least a portion of the data to a baseline that describes a typical range of values for the data and, based on the comparing, identifying at least one deviation of the data from the typical range; storing, on a private distributed ledger system (DLS) that includes multiple host node devices, at least one alert record that describes the at least one deviation of the data from the typical range; and executing at least one smart contract that performs at least one action based on the at least one alert record and in response to the at least one deviation of the data from the typical range, wherein the at least one action includes initiating a network transaction between at least two entities that are authorized to access the private DLS.

These and other implementations can each optionally include one or more of the following innovative aspects: the material is a hydrocarbon material; the one or more IoT devices are arranged, on the vehicle, to monitor the material during its transport; the data further describes one or more of a state of the vehicle, a state of an operator of the vehicle, a location of the vehicle, and/or movement of the vehicle; the at least one alert record indicates the deviation, from the typical range, of the data that describes one or more of the state of the vehicle, the state of the operator, the location of the vehicle, and the movement of the vehicle; the at least one smart contract executes on the DLS; the operations further include receiving a request to access the at least one alert record on the private DLS; the operations further include based on determining that the request is from an entity that is authorized to access the private DLS, providing access to the at least one alert record; and/or the at least one alert record describes one or more of a removal of at least a portion of the material from the vehicle, and/or an adulteration of at least a portion of the material.

Other implementations of any of the above aspects include corresponding systems, apparatus, and/or computer programs that are configured to perform the operations of the methods. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The implementations described herein provide at least the following technical advantages and/or improvements compared to previously available techniques. By using a distributed ledger system for storing IoT-based alert information for material monitoring, implementations incorporate the technical advantages of a distributed ledger including but not limited to data security, data immutability and reliability, and distributed storage (e.g., for failover support and storage redundancy). Use of a distributed ledger can also provide advantages to track and confirm data provenance, and provide data privacy.

It is appreciated that implementations in accordance with the present disclosure can include any combination of the aspects and features described herein. That is, implementations in accordance with the present disclosure are not limited to the combinations of aspects and features specifically described herein, but also include any other appropriate combinations of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are directed to techniques for using a distributed ledger system (DLS) for monitoring the status and transportation of materials, such as a hydrocarbon material (e.g., oil, gas, etc.). In some implementations, a platform employs a DLS, such as a blockchain, and provides a mechanism by which various stakeholders in a hydrocarbon distribution supply chain can access the DLS to receive information regarding the status of transported materials, and receive alerts regarding issues arising during transport. The platform can also include logic, such as one or more smart contracts, that executes to perform actions automatically in response to detected problems that may be reflected in the DLS-stored data. Such actions can include remediation actions to compensate a stakeholder in the event of a theft, degradation, or other loss of transported material. In some implementations, the platform can receive sensor data generated by one or more internet-of-things (IoT) devices, such as devices that are present in a vehicle that transports the material. The sensor data can be analyzed to identify deviations from a typical or expected range of values for the sensor data. Alerts can be generated based on detected deviations, and the alert(s) and/or sensor data can be stored on the DLS to be accessible by the variation stakeholders and the action-performing logic (e.g., smart contracts).

Through use of a DLS, the platform enables the storing, tracking, and/or other analysis of data to be performed efficiently and inexpensively. The DLS also provides security, such that only authorized entities (e.g., stakeholders) are able to access the data stored on the DLS. The DLS also provides immutability, such that data records written to the DLS may not be changed or removed once written. The DLS can be a private DLS that is not accessible to the general public. Accessibility to the platform can be limited to those entities or institutions (e.g., stakeholders) who join and are eligible to access IoT data through the platform. For example, entities permitted to access the DLS may include the various entities involved in the supply chain of the hydrocarbon material, such as a producer (e.g., seller), broker, consumer (e.g., buyer), transportation company, storage company, refinery, and so forth. Accordingly, the DLS can also be described a permissioned DLS.

In some implementations, the DLS includes one or more blockchains. A blockchain is a public or private ledger of transactions that have been executed in one or more contexts (e.g., negotiable instrument transactions, digital currency transactions, access determinations, instances of providing access, etc.). A blockchain may grow as completed blocks are added with a new set of transactions. In some examples, a single block is provided from multiple transactions (e.g., multiple deposits of different checks by different people). In general, blocks are added to the blockchain in a linear, chronological order by one or more computing devices in a peer-to-peer network of interconnected computing devices that execute a blockchain protocol. In short, the peer-to-peer network can be described as a plurality of interconnected nodes, each node being a computing device (or a cluster of multiple devices) that uses a client to validate and relay transactions. Each node maintains a copy of the blockchain, which is automatically downloaded to the node upon joining the peer-to-peer network. The blockchain protocol provides a secure and reliable method of updating the blockchain, copies of which are distributed across the peer-to-peer network, without use of a central authority.

Because all entities on the blockchain network may need to know all previous transactions to validate a requested transaction, all entities must agree on which transactions have actually occurred, and in which order. For example, if two entities observe different transaction histories, they will be unable to come to the same conclusion regarding the validity of a transaction. The blockchain enables all entities to come to an agreement as to transactions that have already occurred, and in which order. In short, and as described in further detail below, a ledger of transactions is agreed to based on the amount of work required to add a transaction to the ledger of transactions (e.g., add a block to the blockchain). Blockchains may also employ other protocols. In this context, the work is a task that is difficult for any single node (e.g., computing device) in the peer-to-peer network to quickly complete, but is relatively easy for a node (e.g., computing device) to verify.

The peer-to-peer network can include so-called miners (e.g., computing devices) that add blocks to a blockchain based on the blockchain protocol. In general, multiple miners validate transactions that are to be added to a block, and compete (e.g., perform work, as introduced above) to have their block added to the blockchain. Other suitable consensus mechanism(s) can also be employed. Validation of transactions includes verifying digital signatures associated with respective transactions. For a block to be added to the blockchain, a miner must demonstrate a proof of work before their proposed block of transactions is accepted by the peer-to-peer network, and is added to the blockchain. A blockchain protocol includes a proof of work scheme that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In some examples, the hash value is a one-way hash value, in that the hash value cannot be 'un-hashed' to determine what the input was. The blockchain protocol can require multiple pieces of information as input to the CHF. For example, the input to the CHF can include a reference to the previous (most recent) block in the blockchain, details of the transaction(s) that are to be included in the to be created block, and a nonce value (e.g., a random number used only once).

Multiple nodes may compete to hash a set of transactions and provide the next block that is to be added to the blockchain. The blockchain protocol provides a threshold hash to qualify a block to be added to the blockchain. For example, the threshold hash can include a predefined number of zeros (0's) that the hash value must have at the beginning (e.g., at least the first four characters of the hash value must each be zero). The higher the number of zeros, the more time-consuming it is to arrive at a qualifying hash value.

In accordance with the blockchain protocol, each miner in the peer-to-peer network receives transaction information for one or more transactions that are to be included in a block that is to be added next in the blockchain. Each miner provides the reference to the previous (most recent) block in the blockchain, details of the transaction(s) that are to be included in the to-be-created block, and the nonce value to the CHF to provide a hash value. If the hash value does not meet the threshold hash (e.g., the first four characters of the hash value are not each zero), the miner starts again to provide another hash value. If the hash value meets the threshold hash (e.g., at least the first four characters of the hash value are each zero), the respective miner successfully created the next block that is to be added to the blockchain. Consequently, the respective miner's block is broadcast across the peer-to-peer network. All other miners cease work (because one miner was already successful), and all copies of the blockchain are updated across the peer-to-peer network to append the block to the blockchain. Each miner may be required to produce hundreds or thousands of hash values, before any one miner provides a qualifying hash value (e.g., at least the first four characters of the hash value are each zero).

In some cases, the distributed ledger or blockchain system can include one or more sidechains. A sidechain can be described as a blockchain that validates data from other blockchains. In some examples, a sidechain enables ledger assets (e.g., a digital currency, records of shares or other items, etc.) to be transferred between multiple blockchains. The blockchain may be a public blockchain, such that data stored on the blockchain is generally accessible. The blockchain may be a private blockchain, such that the stored data is accessible only to authorized individuals and/or processes on the blockchain.

The distribution (e.g., secondary distribution) of materials in a hydrocarbon supply chain can be very complex in nature, and may involve multiple challenges to be addressed such as pilferage, adulteration, safety issues, and so forth. For example, the following scenarios may be particularly common in a supply chain: theft and/or adulteration; and/or a vehicle deviating from its prescribed route. Such scenarios can lead to revenue loss, environmental impact, safety issues, regulatory non-compliance issues, and/or other problems. Currently available solutions are limited in their scope (e.g., point solutions) and may address very limited aspects of these issues, may be subject to tampering, and/or may not scale. In some currently available solutions, data may be lost with the loss of network connectivity between vehicles and servers, for example, such that any data that is available for auditing may be incomplete, corrupted, and/or otherwise unreliable. Accordingly, traditional systems are unreliable from an auditing standpoint, and may not be usable for determining loss, determining regulatory compliance, resolving legal disputes between partners, and/or for other purposes.

Implementations described herein employ a smart vehicle with sensors to measure temperature, density, volume, and/or other characteristics of the transported material, proximity of vehicle to other objects and/or locations, and/or other sensed information. Such an internet-of-things (IoT) implementation may be used in conjunction with an edge computing gateway, with critical elements computing at the edge level in the system even in instances when network connectivity fails. Accordingly, even when edge devices are offline, they may store and analyze at least a portion of data, poll for restored connectivity, and upload data and/or analysis results when connectivity is restored. Implementations can employ a distributed computing environment (e.g., cloud computing) that provides scalability, which may be important as additional vehicles are added and more data collected and analyzed. Implementations can also employ a DLS used to distribute information simultaneously with security, enforce smart contracts, provide an audit trail, and/or other advantages described herein. Machine learning (ML) algorithms can be executed to identify exceptions and capture patterns for identifying new problems, such as new ways of stealing material that vehicle operators may develop over time. Implementations can employ a suitable application framework, such as a version of AngularJS™. In some implementations, data can be collected and/or analyzed in real time. Edge computing can proceed even in instances of lost network connectivity, to provide for a more reliable audit trail and data completeness, compared to traditional solutions. Alerts can be triggered based on individual events or combination of events, based on the application logic to identify risk conditions. For at least these reasons, use of the solutions described herein can provide a substantial return on investment, provide enhanced environmental and safety advantages compared to traditional solutions.

Figure 1:
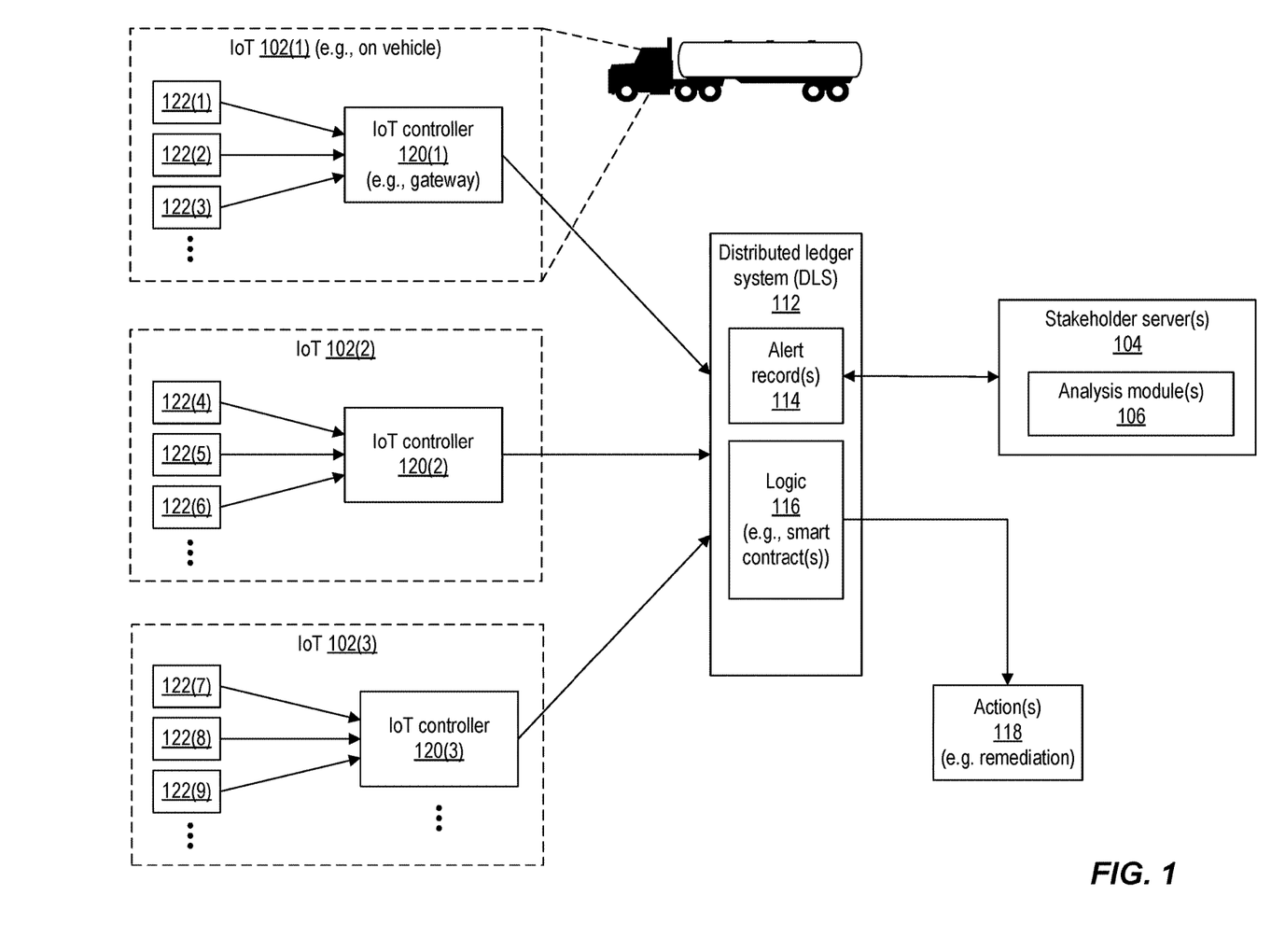
FIG. 1 depicts an example system for material monitoring, according to implementations of the present disclosure.

FIG. 1 depicts an example system for material monitoring, according to implementations of the present disclosure. As shown in the example of FIG. 1, the system can include any suitable number of IoTs 102, each IoT 102 including any suitable number of IoT devices 122. The IoT devices 122 can also be described as sensor devices. The device(s) 122 can be arranged to monitor the state of a material. For example, the device(s) 122 can measure and generate sensor data that describes the temperature, pressure, density, volume, mass, and/or other physical characteristic(s) of the material. In some implementations, the IoT 102 can include device(s) 122 that are present on (or in) a vehicle that is transporting the material, such as a tanker truck transporting a liquid or gaseous (e.g., hydrocarbon) material. Accordingly, an IoT 102 can be some or all of the IoT devices 122 that are present in the vehicle to monitor the material be transported, the operator of the vehicle, and/or the vehicle itself. In some examples, the material being monitored is a hydrocarbon material, such as oil (crude or at least partially refined), gas (e.g., natural gas), petroleum-based fuel, and/or other hydrocarbon material. Accordingly, the material can be a petroleum product at any appropriate state of processing in a supply chain that stores, transports, processes, or otherwise handles the product.

In some implementations, each IoT 102 can include an IoT controller 120, which can also be described as an IoT gateway. The controller 120 can receive the data generated by each IoT device 122 in the IoT 102. In some implementations, the controller 120 can compare each data element (e.g., parameter value) in the data to a baseline of acceptable, typical, and/or normal value(s) for that data element, to determine whether the data element deviates from its expected or acceptable range of values. For example, a data element that describes the current pressure, temperature, volume, or density of the material can be compared to an acceptable range of such values. Any deviation from the baseline can be the basis for an alert record that is generated by the IoT controller 120. The alert record 114 can describe the data element that has deviated, the deviation value, a timestamp (e.g., date and time), the identifier of the IoT 102 (e.g., vehicle) where the deviation occurred, and/or other information.

As further shown in the example of FIG. 1, the system can include a DLS 112. The DLS 112 can be a private DLS, and access to the private DLS can be controlled such that authorized entities (e.g., stakeholders) are able to access the data stored on the DLS 112, but the general public may not be able to access the data. A private DLS can also be described as a permissioned DLS, given that access to the DLS can be permission-based and restricted to authorized entities that have been granted permission to access the DLS, such as stakeholders. The DLS 112 can store one or more alert records 114 that each indicates a deviation of a data element from a baseline range of values, as described above. Accordingly, the IoT controllers 120 can access the DLS 112 to write the alert record(s) 114 to the DLS 112. In some implementations, the IoT controllers 120 can convert the temperature and pressure data received from the IoT device(s) 122 to a standard temperature and pressure format, and the alert record(s) 114 can describe the deviation in terms of the standard temperature and pressure of the material.

The DLS 112 can be hosted by multiple nodes, with each node including a computing device or cluster of computing devices with sufficient storage, processing, and/or network capacity to participate in the DLS 112. In some examples, the DLS 112 can be based on a version of a Hyperledger™ blockchain implementation. The DLS 112 can also be described as the platform.

One or more stakeholder server devices 104 can access the DLS 112 to retrieve the alert record(s) 114 as needed. In some examples, each server 104 (e.g., server computing device) can execute one or more analysis modules 106 that analyze the data stored on the DLS 112, such as the alert record(s) 114. For example, a particular stakeholder can be interested in the physical conditions of the material during its transport, and retrieve alerts that describe the deviation of such conditions (e.g., pressure, temperature, etc.) from the typical or acceptable (tolerable) baseline for such parameters. The analysis module(s) 106 may analyze the alert record(s) 114 and perform operations such as sending notifications to appropriate personnel.

In some implementations, the platform can include logic 116 such as one or more smart contracts. The logic 116 can execute on the DLS 112, or elsewhere, and can autonomously and automatically analyze the alert records 114 to identify instances in which remediation between stakeholders is appropriate. The logic 116 can perform such action(s) 118 for remediation. For example, an alert record 114 indicating a loss of a portion of the transported material (e.g., through theft, accident, and so forth) can be analyzed by a smart contract, and if the terms of the contract indicate that one stakeholder is to compensate another stakeholder for the loss, the smart contract can automatically initiate an action 118 that is a network (e.g., payment) transaction from the compensating stakeholder to the compensated stakeholder (e.g., a funds transfer). Other suitable remediation actions can also be taken, such as notifications sent to the appropriate stakeholders, notifications sent to emergency services (e.g., for fire and/or other safety hazards), and so forth. In some examples, the action(s) 118 can include generation of an invoice for payment from one stakeholder to another. Generation of the invoice can include generating an electronic version of the invoice, and communicating the invoice over a network to the appropriate stakeholder(s). Generation of the invoice can also include sending a signal to a printing device to cause the printing device to generate a physical (e.g., paper) copy of the invoice that is suitable for mailing, reading, filing, or other actions.

Figure 2:
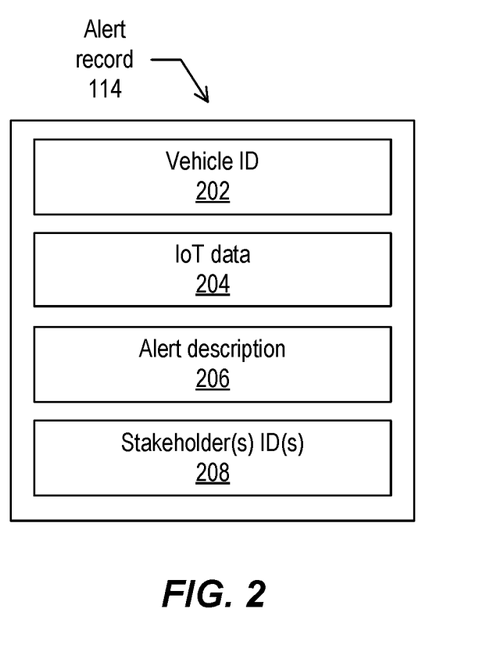
FIG. 2 depicts an example alert record, according to implementations of the present disclosure.

FIG. 2 depicts an example alert record 114, according to implementations of the present disclosure. An alert record 114 can include, but is not limited to, the following information: an ID 202, identifying the IoT 102 (e.g., the vehicle) where the deviation was detected; IoT data 204, indicating the data that was outside its baseline and/or the amount or degree of such deviation; an alert description 206 providing more information (e.g., context) regarding the deviation; and/or stakeholder ID(s) 208 indicating which stakeholder(s) are affected by the detected deviation. The record can also include other information such as a timestamp (e.g., date and/or time when the request was received and/or record written), a unique identifier of the record, and so forth. In some implementations, the alert record 114 does not include an alert description 206, and instead may store metadata or some other reference to descriptive information that is stored externally to the DLS.

As described above, the data generated by the IoT devices (e.g., the sensor data) can be communicated (e.g., over wired and/or wireless local network connections in the vehicle) to the IoT controller for the IoT that includes the IoT devices. The IoT controller can process the received raw data, convert to standard temperature and pressure in some instances, and compare the data to baseline data to determine whether any atypical conditions are present in the material and/or the vehicle (or with respect to the vehicle operator). The controller can monitor for changes in the data that move the data outside the baseline range of acceptable values.

In some examples, the IoT devices can monitor the loading and unloading of the material to and from the vehicle, and the stored material during transport. Monitoring can include measurement of temperature, density, pressure, volume, and/or other characteristics, such as that the IoT devices include temperature sensors, pressure sensors, level gauges to measure volume of the material, and so forth. Alerts in such examples can indicate instances when the measured characteristics (e.g., temperature, pressure, etc.) are outside an acceptable range of baseline values.

IoT devices can also include telematics devices that are configured to monitor the operations and/or operating state of the vehicle itself, to measure acceleration or deceleration, braking, swerving, vehicle speed, direction of travel, location, orientation (e.g., if the vehicle is overturned), and so forth. Alerts in such examples can indicate unsafe operation of the vehicle (e.g., sudden braking, swerving, etc.), crashes or other collisions, unexpected route changes based on monitored location of the vehicle, unexpected idling activity, and so forth. IoT devices can also include camera(s) and/or microphone(s) that generate image data, audio data, and/or video data of the exterior of the vehicle and/or the interior of the vehicle, such as the storage compartment for the material and/or the operator cab of the vehicle.

The alerts can also indicate unexpected opening of the container that stores the material during transport, loss of material, draining, intrusion detection, and/or any other change (e.g., fluctuation or absolute loss) in the level of the material that is unexpected, such as a change that is uncorrelated with a scheduled unloading of the material. In some examples, the IoT device(s) can monitor the operator of the vehicle, to detect unauthorized behavior, absence from the vehicle, fatigue, intoxication, and/or unsafe behavior in general.

The stakeholder servers can each access the data stored on the DLS, such that the stakeholders all have access to the same data at the same time. Such access enables the stakeholder devices to perform real time monitoring operations to monitor the transport of the material, and identify relevant changes to the state of the material. The stakeholder server(s) can perform various types of analytics including modeling to identify risk conditions and/or predictive modeling to determine future potential problems. The smart contracts can operate independently of the stakeholder server software to monitor for any breach of contractual terms between stakeholder parties, and to take appropriate actions for accountability and/or remediation in the event of a breach of contractual terms.

The controller(s) can determine the circumstances when an alert record is to be written to the DLS, based on the particular data being monitored. For example, alert records can be written when certain data elements (e.g., temperature, pressure, etc.) deviate from the baseline range, as described above. In some instances, a particular event can also lead to an alert record, such as a detected collision of the vehicle and/or a detected intrusion to the material storage container on the vehicle (e.g., any instance where the container is opened in an unexpected location or at an unexpected time).

The alert record can include the data that reflects the detected change of state, or that otherwise indicates the problem.

In some implementations, the monitoring of the data and the generation of alerts, and the operations of the smart contracts, can occur in real time with respect to the collection of the data by the IoT devices. As used herein, a real time operation may describe an operation that is performed based on a triggering event and without any intentional delay between the performed operation and the triggering event, taking into account the processing and/or communication limitations of the computing system(s) performing the operation and the time needed to initiate and/or perform the operation. The triggering event may be a received communication, a detection of a particular application state, another operation performed by the same or a different process, and so forth. A real time operation may also be described as a dynamic operation. Real time operations may include operations that are automatically executed in response to the triggering event without requiring further human input after the triggering event and before execution of the real time operation. In some examples, a real time operation may be performed within a same execution path as a process that detects and/or handles the triggering event. For example, the real time operation may be performed or initiated by code that executes as part of the handling of the event and/or in response to a message that is sent as part of the handling of the event. A real time operation may, in at least some instances, be performed synchronously with respect to the triggering event. For example, the comparing of the raw data to baseline and generation of alerts can happen in real time as the controller(s) receive the raw data from the IoT devices, and the operation of the smart contracts to perform remediation actions can happen in real time with respect to the alerts being written to the DLS.

The oil and gas industry loses billions of dollars in the supply chain from distribution terminals to gas stations and/or industrial customers, due to theft, pilferage, and adulteration (e.g., corruption or contamination of the transported material). Additionally, safety aspects of the transportation of the material is very important and operator behavior is a key aspect to safety. Also of interest are truck operator productivity as the cost of transportation is a cost driver in supply and distribution of petroleum products.

Implementations provide a platform that addresses these challenges, and provides improved monitoring and alert generation, and automatic remediation, which is not provided by previously available solutions. The various components of the solution described herein include the DLS, the IoT devices, and the baseline analysis to detect intrusion, pilferage, and/or adulteration. In some implementations, the DLS can be hosted on nodes that are owned by, operated by, and/or otherwise associated with the various stakeholders in the supply chain, including the scheduler, the transporter, the territory manager, and the retailer who can be alerted if there is a determination of route deviation, intrusion, and/or any changes to the level or density of the material compared to bill of lading details. Based on actual delivered quantity of the material, the invoicing of the transporter can be performed automatically by deducting abnormal stock loses from the final payment to the transporter. Such deductions can be supported by the immutable records on the DLS, which establish and prove the abnormal or atypical the stock losses.

Accordingly, the platform can enable savings in millions of dollars that would otherwise be lost through theft and pilferage, and/or adulteration. Abnormal stock losses can be made accountable to the transporter and it can be deducted from the transporter payment. Moreover, adulteration is brand risk for oil companies, in that adulteration can lead to a lower quality product. The platform can also help avoid such incidents and also identify potential problems. The platform contributes to the safety of distribution of petroleum products by checking driver behavior and alerting stake holders if safety issues are detected, such as unsafe driving, excessive speed, sudden braking, swerving, careless or inattentive drivers, overly fatigued drivers, and so forth. The platform tracks vehicle operator productivity, lay time, average speed, deviations, and so forth, such that even a savings of a few cents per kilometer or kiloliter can lead to a substantial cumulative benefit. Through the combination of IoT and DLS technology, implementations provide a solution that is simple, reliable, that provides transparency, and that is readily auditable with high confidence in the stored data due to the immutability of the DLS storage.

Figure 3:
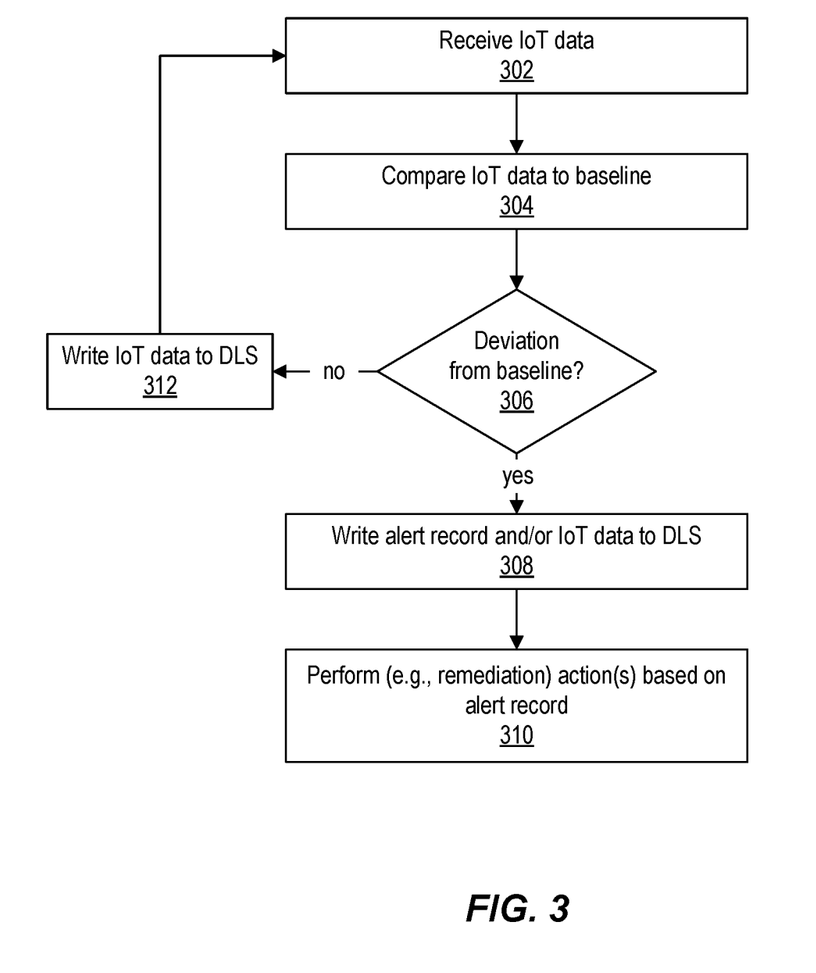
FIG. 3 depicts a flow diagram of an example process for writing data to a distributed ledger system, according to implementations of the present disclosure.

FIG. 3 depicts a flow diagram of an example process for writing data to the DLS 112, according to implementations of the present disclosure. Operations of the process can be performed by one or more of the IoT device(s) 122, the IoT controller(s) 120, the logic 116 (e.g., smart contract(s)), the analysis module(s) 106, and/or other software module(s) executing on the DLS 112 node(s), the stakeholder server(s) 104, or elsewhere.

The IoT data is received (302) from the IoT devices, e.g., by the IoT controller in the vehicle. The IoT data can be compared to the baseline data (304) as described above. If any deviation from the baseline is detected (306), one or more alert records can be written to the DLS (308). In some implementations, the IoT data can also be written to the DLS. The IoT data can be written when a deviation from baseline is detected. The IoT data can also be written in instances when the IoT data is within the baseline such that an alert may not be generated. The smart contracts or other logic can automatically perform (310) remediation actions based on the alert record(s) and/or data as described above. If deviation is not detected, the process can write the IoT data to the DLS (312), and continue monitoring incoming IoT data.

Figure 4:
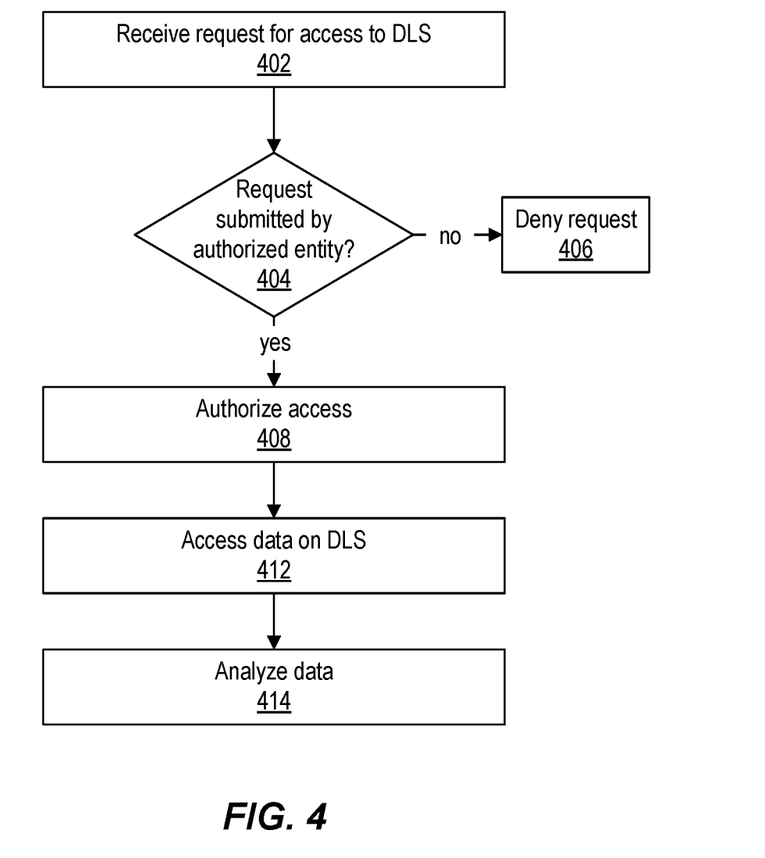
FIG. 4 depicts a flow diagram of an example process for accessing data on the distributed ledger system, according to implementations of the present disclosure.

FIG. 4 depicts a flow diagram of an example process for accessing data on the DLS 112, according to implementations of the present disclosure. Operations of the process can be performed by one or more of the IoT device(s) 122, the IoT controller(s) 120, the logic 116 (e.g., smart contract(s)), the analysis module(s) 106, and/or other software module(s) executing on the DLS 112 node(s), the stakeholder server(s) 104, or elsewhere.

A request can be received (402) for access to the DLS. A determination can be made (404) whether the request was sent by an authorized entity, such as one of the stakeholders authorized to access the private DLS as described above. If not, the request can be denied (406). If so, the access is authorized (408), and the requestor is permitted to access the data stored on the DLS (412). The requestor can retrieve and analyze the data (414) as described above, for real time data analysis and/or batch analysis to look for trends and patterns, for predictive modeling, for risk modeling, and so forth.

Figure 5:
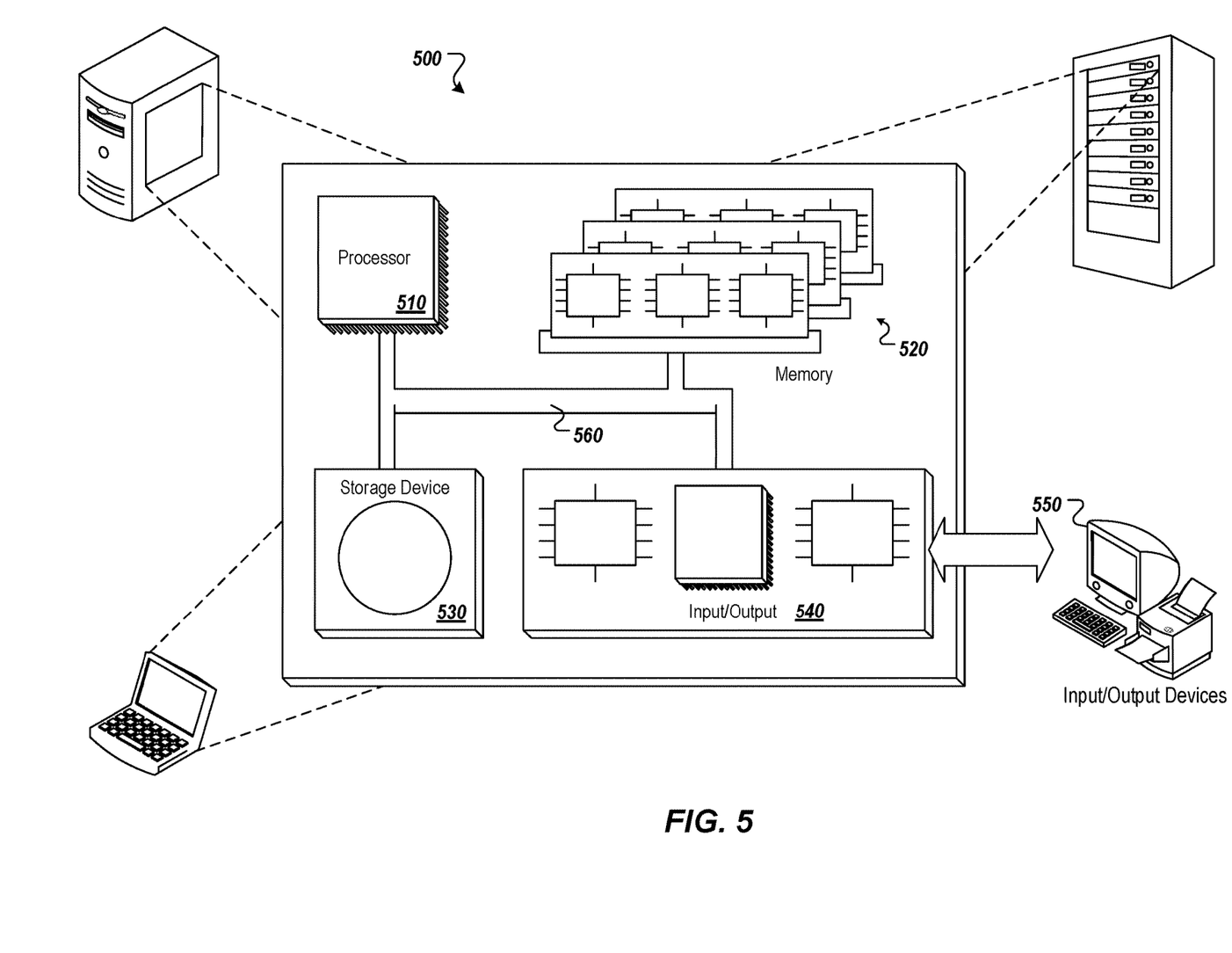
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the stakeholder server(s) 104, the node(s) that host the DLS 112, the IoT controller(s) 120, the IoT device(s) 122, and/or other computing device(s) or system(s) described herein. The system 500 may include one or more processors 510, a memory 520, one or more storage devices 530, and one or more input/output (I/O) devices 550 controllable via one or more I/O interfaces 540. The various components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. For example, the processor(s) 510 may execute instructions for the various software module(s) described herein. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more communication networks using any network protocol.

Computing devices of the system 500 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth.

Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The invention claimed is:

1. A method performed by at least one processor, the method comprising:
   receiving, by the at least one processor, data generated by one or more internet-of-things (IoT) devices that are arranged to monitor a material transported on a vehicle, the data describing a current state of at least a portion of the material;
   comparing, by the at least one processor, at least a portion of the data to a baseline that describes a typical range of values for the data and, based on the comparing, identifying at least one deviation of the data from the typical range;
   storing, by the at least one processor, on a private distributed ledger system (DLS) in a blockchain network that includes multiple host node devices, at least one alert record that describes the at least one deviation of the data from the typical range; and
   in response to the at least one deviation of the data from the typical range, executing, by the at least one processor, at least one smart contract of the blockchain network that performs at least one remediation action between at least two entities affected by the at least one deviation, based on the at least one alert record, wherein the at least two entities affected by the at least one deviation comprises a compensating entity and a compensated entity, and the at least one remediation action includes initiating a blockchain network transaction that transfers a payment from the compensating entity to the compensated entity.

2. The method of claim 1, wherein the material is a hydrocarbon material.

3. The method of claim 1, wherein the one or more IoT devices are arranged, on the vehicle, to monitor the material during its transport.

4. The method of claim 3, wherein the data further describes one or more of:
   a state of the vehicle;
   a state of an operator of the vehicle;
   a location of the vehicle; and
   movement of the vehicle.

5. The method of claim 4, wherein the at least one alert record indicates the deviation, from the typical range, of the data that describes one or more of the state of the vehicle, the state of the operator, the location of the vehicle, and the movement of the vehicle.

6. The method of claim 1, wherein the at least one smart contract executes on the DLS.

7. The method of claim 1, further comprising:
   receiving, by the at least one processor, a request to access the at least one alert record on the private DLS; and
   based on determining that the request is from an entity that is authorized to access the private DLS, providing, by the at least one processor, access to the at least one alert record.

8. The method of claim 1, wherein the at least one alert record describes one or more of:
   a removal of at least a portion of the material from the vehicle; and
   an adulteration of at least a portion of the material.

9. A system comprising:
   at least one processor; and
   a memory communicatively coupled to the at least one processor, the memory storing instructions which, when executed, cause the at least one processor to perform operations comprising:
      receiving data generated by one or more internet-of-things (IoT) devices that are arranged to monitor a material transported on a vehicle, the data describing a current state of at least a portion of the material;
      comparing at least a portion of the data to a baseline that describes a typical range of values for the data and, based on the comparing, identifying at least one deviation of the data from the typical range;
      storing, on a private distributed ledger system (DLS) in a blockchain network that includes multiple host node devices, at least one alert record that describes the at least one deviation of the data from the typical range; and
      in response to the at least one deviation of the data from the typical range, executing at least one smart contract of the blockchain network that performs at least one remediation action between at least two entities affected by the at least one deviation, based on the at least one alert record, wherein the at least two entities affected by the at least one deviation comprises a compensating entity and a compensated entity, and the at least one remediation action includes initiating a blockchain network transaction that transfers a payment from the compensating entity to the compensated entity.

10. The system of claim 9, wherein the material is a hydrocarbon material.

11. The system of claim 9, wherein the one or more IoT devices are arranged, on the vehicle, to monitor the material during its transport.

12. The system of claim 11, wherein the data further describes one or more of:
    a state of the vehicle;
    a state of an operator of the vehicle;
    a location of the vehicle; and
    movement of the vehicle.

13. The system of claim 12, wherein the at least one alert record indicates the deviation, from the typical range, of the data that describes one or more of the state of the vehicle, the state of the operator, the location of the vehicle, and the movement of the vehicle.

14. The system of claim 9, wherein the at least one smart contract executes on the DLS.

15. The system of claim 9, the operations further comprising:
  receiving a request to access the at least one alert record on the private DLS; and
  based on determining that the request is from an entity that is authorized to access the private DLS, providing access to the at least one alert record.

16. The system of claim 9, wherein the at least one alert record describes one or more of:
  a removal of at least a portion of the material from the vehicle; and
  an adulteration of at least a portion of the material.

17. One or more computer-readable storage media storing instructions which, when executed, cause at least one processor to perform operations comprising:
  receiving data generated by one or more internet-of-things (IoT) devices that are arranged to monitor a material transported on a vehicle, the data describing a current state of at least a portion of the material;
  comparing at least a portion of the data to a baseline that describes a typical range of values for the data and, based on the comparing, identifying at least one deviation of the data from the typical range;
  storing, on a private distributed ledger system (DLS) in a blockchain network that includes multiple host node devices, at least one alert record that describes the at least one deviation of the data from the typical range; and
  in response to the at least one deviation of the data from the typical range, executing at least one smart contract of the blockchain network that performs at least one remediation action between at least two entities affected by the at least one deviation, based on the at least one alert record, wherein the at least two entities affected by the at least one deviation comprises a compensating entity and a compensated entity, and the at least one remediation action includes initiating a blockchain network transaction that transfers a payment from the compensating entity to the compensated entity.

18. The one or more computer-readable storage media of claim 17, wherein the one or more IoT devices are arranged, on the vehicle, to monitor the material during its transport.

19. The one or more computer-readable storage media of claim 18, wherein the data further describes one or more of:
  a state of the vehicle;
  a state of an operator of the vehicle;
  a location of the vehicle; and
  movement of the vehicle.

20. The one or more computer-readable storage media of claim 19, wherein the at least one alert record indicates the deviation, from the typical range, of the data that describes one or more of the state of the vehicle, the state of the operator, the location of the vehicle, and the movement of the vehicle.

* * * * *